(12) United States Patent
Wang et al.

(10) Patent No.: US 10,728,809 B2
(45) Date of Patent: Jul. 28, 2020

(54) CELL RESELECTION METHOD AND APPARATUS

(71) Applicant: Huawei Technologies Co., Ltd., Shenzhen, Guangdong, P.R. (CN)

(72) Inventors: Rui Wang, Shanghai (CN); Mingzeng Dai, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

(21) Appl. No.: 16/403,067

(22) Filed: May 3, 2019

(65) Prior Publication Data
US 2019/0261236 A1  Aug. 22, 2019

Related U.S. Application Data

(63) Continuation of application No. PCT/CN2017/109387, filed on Nov. 3, 2017.

(30) Foreign Application Priority Data

Nov. 4, 2016 (CN) .......................... 2016 1 0979443

(51) Int. Cl.
*H04W 36/00* (2009.01)
*H04W 36/30* (2009.01)
(Continued)

(52) U.S. Cl.
CPC . *H04W 36/00837* (2018.08); *H04W 36/0072* (2013.01); *H04W 36/0088* (2013.01);
(Continued)

(58) Field of Classification Search
CPC ....... H04W 36/0072; H04W 36/00835; H04W 36/00837; H04W 36/0088; H04W 36/04; H04W 36/30; H04W 48/18
See application file for complete search history.

(56) References Cited

U.S. PATENT DOCUMENTS

2012/0322447 A1  12/2012  Ramachandran et al.
2014/0036874 A1   2/2014  Jeong et al.
(Continued)

FOREIGN PATENT DOCUMENTS

CN   102137423 A   7/2011
CN   102857981 A   1/2013
(Continued)

OTHER PUBLICATIONS

3GPP TR 38.801 V0.4.0, 3rd Generation Partnership Project; Technical Specification Group Radio Access Network; Study on New Radio Access Technology; Radio Access Architecture and Interfaces (Release 14); Aug. 2016, 36 pages.
(Continued)

*Primary Examiner* — Liton Miah
(74) *Attorney, Agent, or Firm* — Slater Matsil, LLP

(57) ABSTRACT

This application provides a cell reselection method and apparatus. The method includes: measuring, by a terminal, reference signals of X neighboring cells that work on a target frequency, to obtain X signal measurement values; and if the terminal determines that signal measurement values of N cells in the X neighboring cells meet a cell reselection condition, using, by the terminal as a reselected cell when determining that there is at least one evolved long term evolution cell in the N cells, a cell with a largest signal measurement value in the at least one evolved long term evolution cell.

20 Claims, 3 Drawing Sheets

(51) Int. Cl.
*H04W 48/18* (2009.01)
*H04W 36/04* (2009.01)

(52) U.S. Cl.
CPC ..... *H04W 36/00835* (2018.08); *H04W 36/04* (2013.01); *H04W 36/30* (2013.01); *H04W 48/18* (2013.01)

(56) References Cited

U.S. PATENT DOCUMENTS

| | | | | |
|---|---|---|---|---|
| 2017/0332372 | A1* | 11/2017 | Lee | H04W 72/0413 |
| 2018/0035346 | A1* | 2/2018 | Fujishiro | H04W 16/32 |
| 2018/0049087 | A1* | 2/2018 | Lee | H04W 24/08 |
| 2018/0288667 | A1* | 10/2018 | Xie | H04W 36/30 |
| 2019/0150071 | A1* | 5/2019 | Lee | H04W 4/70 370/328 |
| 2019/0182762 | A1* | 6/2019 | Mutikainen | H04W 48/18 |
| 2019/0297538 | A1* | 9/2019 | Keller | H04W 36/0022 |

FOREIGN PATENT DOCUMENTS

| | | |
|---|---|---|
| CN | 103327546 A | 9/2013 |
| CN | 104980980 A | 10/2015 |
| CN | 105101330 A | 11/2015 |
| CN | 105991711 A | 10/2016 |
| WO | 2013024109 A1 | 2/2013 |
| WO | 2015138097 A2 | 9/2015 |

OTHER PUBLICATIONS

3GPP TS 36.304 V14.0.0, 3rd Generation Partnership Project; Technical Specification Group Radio Access Network; Evolved Universal Terrestrial Radio Access (E-UTRA); User Equipment (UE) procedures in idle mode (Release 14); Sep. 2016, 46 pages.

3GPP TS 36.331 V14.0.0, 3rd Generation Partnership Project; Technical Specification Group Radio Access Network; Evolved Universal Terrestrial Radio Access (E-UTRA); Radio Resource Control (RRC); Protocol specification (Release 14); Sep. 2016, 644 pages.

Samsung, "Service Specific Cell (Re-) Selection in NR", 3GPP TSG-RAN WG2 Meeting #94, R2-163373, Nanjing, China, May 23-27, 2016, total 4 pages.

Huawei, "NR location area management", 3GPP TSG-RAN, WG3 Meeting, #93, R3-161758, Aug. 22-26, 2016, XP051134887, 3 pages.

3GPP TS 36.304 V12.8.0, "3rd Generation Partnership Project; Technical Specification Group Radio Access Network; Evolved Universal Terrestrial Radio Access (E-UTRA); User Equipment (UE) procedures in idle mode", (Release 12), Jul. 2016, XP051295302, 38 pages.

Nokia Siemens Networks, et al., "E-UTRA Measurements and Cell Reselection Considerations", 3GPP TSG-RAN, WG2 Meeting, #58bis, R2-072386 (R2-071727), Jun. 2007, XP050135231, 6 pages.

* cited by examiner

CELL RESELECTION METHOD AND APPARATUS

CROSS-REFERENCE TO RELATED APPLICATIONS

This application is a continuation of International Application No. PCT/CN2017/109387 filed on Nov. 3, 2017, which claims priority to Chinese Patent Application No. 201610979443.9 filed on Nov. 4, 2016. The disclosures of the aforementioned applications are hereby incorporated by reference in their entireties.

TECHNICAL FIELD

This application relates to the field of communications technologies, and in particular, to a cell reselection method and apparatus.

BACKGROUND

In an existing long term evolution (LTE) system, an access network device in LTE accesses an evolved packet core network (EPC) through an Si interface, and in addition, access network devices are connected to each other through an X2 interface to exchange information. During smooth evolution from a 4G core network to a 5G core network, the LTE system may be evolved into an evolved LTE (eLTE) system, and therefore an access network device in eLTE has a function of accessing the 5G core network. In the embodiments of this application, the 5G core network that supports the new function is also referred to as a next-generation core network (NG-Core). On an air interface, the eLTE system still provides a service for a terminal in an LTE manner.

To use the new function enhanced in eLTE, in a deployment scenario in which eLTE and LTE coexist, the access network device in eLTE and the access network device in LTE use a same frequency and a same air interface technology, especially a same physical layer technology. However, in the foregoing scenario, currently, there is no effective solution for accessing an evolved long term evolution cell by the terminal.

SUMMARY

Embodiments of this application provide a cell reselection method and apparatus, to implement access of a terminal to an evolved long term evolution cell.

An embodiment of this application provides a cell reselection method, including:

measuring, by a terminal, reference signals of X neighboring cells that work on a target frequency, to obtain X signal measurement values; and if the terminal determines that signal measurement values of N cells in the X neighboring cells meet a cell reselection condition, using, by the terminal as a reselected cell when determining that there is at least one evolved long term evolution cell in the N cells, a cell with a largest signal measurement value in the at least one evolved long term evolution cell.

According to the method provided in this embodiment of this application, the terminal obtains the X signal measurement values after performing measurement on the target frequency; and after the terminal determines that the signal measurement values of the N cells in the X neighboring cells meet the cell reselection condition, the terminal uses, as the reselected cell when determining that there is at least one evolved long term evolution cell in the N cells, the cell with the largest signal measurement value in the at least one evolved long term evolution cell. In the foregoing method, the terminal can access an evolved long term evolution cell with a largest signal measurement value, to improve signal quality of the terminal.

Optionally, if a cell reselection priority of the target frequency is the same as a cell reselection priority of a working frequency of a currently camped-on cell, after the measuring, by a terminal, reference signals of X neighboring cells that work on a target frequency, to obtain X signal measurement values, the method further includes:

measuring, by the terminal, a reference signal of the currently camped-on cell to obtain a signal measurement value of the currently camped-on cell; and if the terminal determines that signal measurement values of N cells in the currently camped-on cell and the X neighboring cells meet the cell reselection condition, ranking, by the terminal, the N cells based on the signal measurement values of the N cells, and using, as a reselected cell when determining that there is at least one evolved long term evolution cell in the N cells, a cell with a highest rank in the at least one evolved long term evolution cell.

Optionally, the method further includes:

if the terminal determines that there is no evolved long term evolution cell in the N cells, using, by the terminal as a reselected cell, a cell with a largest signal measurement value in the N cells.

Optionally, the method further includes:

if the terminal determines that there is no evolved long term evolution cell in the N cells, for M cells that work on a frequency other than the target frequency, using, by the terminal as a reselected cell when there is an evolved long term evolution cell in the M cells, a cell whose signal measurement value is largest and is greater than a preset threshold and that has a highest working frequency priority in the evolved long term evolution cell in the M cells.

Optionally, the method further includes:

if the terminal determines that there is no evolved long term evolution cell whose signal measurement value is greater than a preset threshold in the N cells, for M cells that work on a frequency other than the target frequency, using, by the terminal as a reselected cell when there is no evolved long term evolution cell whose signal measurement value is greater than the preset threshold in the M cells, a cell whose signal measurement value is largest and is greater than the preset threshold in the M cells.

Optionally, before the terminal determines that there is at least one evolved long term evolution cell in the N cells, the method further includes:

for any one of the N cells, receiving, by the terminal, first cell type indication information sent by the currently camped-on cell, or receiving, by the terminal, first cell type indication information sent by the neighboring cell, where the first cell type indication information indicates that the cell is an evolved long term evolution cell; and determining, by the terminal according to the first cell type indication information, whether the currently camped-on cell is an evolved long term evolution cell.

Optionally, before the terminal determines that there is at least one evolved long term evolution cell in the N cells, the method further includes:

receiving, by the terminal, second cell type indication information sent by the currently camped-on cell, where the second cell type indication information indicates that the neighboring cell of the cell on which the terminal currently camps is an evolved long term evolution cell.

Optionally, before the measuring, by a terminal, reference signals of X neighboring cells that work on a target frequency, the method further includes:

receiving, by the terminal, a notification message sent by an access network device, where the notification message indicates that there is an evolved long term evolution cell on the target frequency.

Optionally, the method further includes:

determining, by the terminal, that the currently camped-on cell is not an evolved long term evolution cell.

An embodiment of this application provides a cell reselection apparatus, including:

a transceiver unit, configured to measure reference signals of X neighboring cells that work on a target frequency, to obtain X signal measurement values; and a processing unit, configured to: if it is determined that signal measurement values of N cells in the X neighboring cells meet a cell reselection condition, use, as a reselected cell when determining that there is at least one evolved long term evolution cell in the N cells, a cell with a largest signal measurement value in the at least one evolved long term evolution cell.

Optionally, if a cell reselection priority of the target frequency is the same as a cell reselection priority of a working frequency of a currently camped-on cell, after the reference signals of the X neighboring cells that work on the target frequency are measured to obtain the X signal measurement values, the processing unit is further configured to:

measure a reference signal of the currently camped-on cell to obtain a signal measurement value of the currently camped-on cell; and if it is determined that signal measurement values of N cells in the currently camped-on cell and the X neighboring cells meet the cell reselection condition, rank the N cells based on the signal measurement values of the N cells, and use, as a reselected cell when determining that there is at least one evolved long term evolution cell in the N cells, a cell with a highest rank in the at least one evolved long term evolution cell.

Optionally, the processing unit is further configured to:

if it is determined that there is no evolved long term evolution cell in the N cells, use, as a reselected cell, a cell with a largest signal measurement value in the N cells.

Optionally, the processing unit is further configured to:

if it is determined that there is no evolved long term evolution cell in the N cells, for M cells that work on a frequency other than the target frequency, use, as a reselected cell when there is an evolved long term evolution cell in the M cells, a cell whose signal measurement value is largest and is greater than a preset threshold and that has a highest working frequency priority in the evolved long term evolution cell in the M cells.

Optionally, the processing unit is further configured to:

if it is determined that there is no evolved long term evolution cell whose signal measurement value is greater than a preset threshold in the N cells, for M cells that work on a frequency other than the target frequency, use, as a reselected cell when there is no evolved long term evolution cell whose signal measurement value is greater than the preset threshold in the M cells, a cell whose signal measurement value is largest and is greater than the preset threshold in the M cells.

Optionally, the transceiver unit is further configured to:

for any one of the N cells, receive first cell type indication information sent by the currently camped-on cell, or receive first cell type indication information sent by the neighboring cell, where the first cell type indication information indicates that the cell is an evolved long term evolution cell; and determine, according to the first cell type indication information, whether the cell is an evolved long term evolution cell.

Optionally, the transceiver unit is further configured to:

receive second cell type indication information sent by the currently camped-on cell, where the second cell type indication information indicates that the neighboring cell of the cell on which the terminal currently camps is an evolved long term evolution cell.

Optionally, the transceiver unit is further configured to:

receive a notification message sent by an access network device, where the notification message indicates that there is an evolved long term evolution cell on the target frequency.

Optionally, the transceiver unit is further configured to:

determine that the currently camped-on cell is not an evolved long term evolution cell.

A terminal is provided, including:

a transceiver, configured to measure reference signals of X neighboring cells that work on a target frequency, to obtain X signal measurement values; and a processor, configured to: if it is determined that signal measurement values of N cells in the X neighboring cells meet a cell reselection condition, use, as a reselected cell when determining that there is at least one evolved long term evolution cell in the N cells, a cell with a largest signal measurement value in the at least one evolved long term evolution cell.

Optionally, if a cell reselection priority of the target frequency is the same as a cell reselection priority of a working frequency of a currently camped-on cell, after the reference signals of the X neighboring cells that work on the target frequency are measured to obtain the X signal measurement values, the processor is further configured to:

measure a reference signal of the currently camped-on cell to obtain a signal measurement value of the currently camped-on cell; and if it is determined that signal measurement values of N cells in the currently camped-on cell and the X neighboring cells meet the cell reselection condition, rank the N cells based on the signal measurement values of the N cells, and use, as a reselected cell when determining that there is at least one evolved long term evolution cell in the N cells, a cell with a highest rank in the at least one evolved long term evolution cell.

Optionally, the processor is further configured to:

if it is determined that there is no evolved long term evolution cell in the N cells, use, as a reselected cell, a cell with a largest signal measurement value in the N cells.

Optionally, the processor is further configured to:

if it is determined that there is no evolved long term evolution cell in the N cells, for M cells that work on a frequency other than the target frequency, use, as a reselected cell when there is an evolved long term evolution cell in the M cells, a cell whose signal measurement value is largest and is greater than a preset threshold and that has a highest working frequency priority in the evolved long term evolution cell in the M cells.

Optionally, the processor is further configured to:

if it is determined that there is no evolved long term evolution cell whose signal measurement value is greater than a preset threshold in the N cells, for M cells that work on a frequency other than the target frequency, use, as a reselected cell when there is no evolved long term evolution cell whose signal measurement value is greater than the preset threshold in the M cells, a cell whose signal measurement value is largest and is greater than the preset threshold in the M cells.

Optionally, the transceiver is further configured to:

for any one of the N cells, receive first cell type indication information sent by the currently camped-on cell, or receive first cell type indication information sent by the neighboring cell, where the first cell type indication information indicates that the cell is an evolved long term evolution cell; and determine, according to the first cell type indication information, whether the cell is an evolved long term evolution cell.

Optionally, the transceiver is further configured to:

receive second cell type indication information sent by the currently camped-on cell, where the second cell type indication information indicates that the neighboring cell of the cell on which the terminal currently camps is an evolved long term evolution cell.

Optionally, the transceiver is further configured to:

receive a notification message sent by an access network device, where the notification message indicates that there is an evolved long term evolution cell on the target frequency.

Optionally, the transceiver is further configured to:

determine that the currently camped-on cell is not an evolved long term evolution cell.

DETAILED DESCRIPTION

Embodiments of this application can be applied to various communications systems, such as a global system for mobile communications (GSM) system, a code division multiple access (CDMA) system, a wideband code division multiple access (WCDMA) system, a general packet radio service (GPRS) system, a long term evolution (LTE) system, an advanced long term evolution (LTE-A) system, a universal mobile telecommunications system (UMTS), an evolved long term evolution (eLTE) system, a 5G system, and another mobile communications system.

In the following, some terms in this application are described, so as to help persons skilled in the art have a better understanding.

(1) A terminal is also referred to as user equipment (UE), and is a device that provides a user with voice and/or data connectivity, for example, a handheld device with a wireless connection function, or an in-vehicle device. Common terminals include, for example, a mobile phone, a tablet computer, a notebook computer, a palmtop computer, a mobile internet device (MID), and a wearable device such as a smartwatch, a smart band, or a pedometer.

(2) An access network device may be a common base station (for example, a NodeB or eNB), a new radio controller (NR controller), a centralized network element (Centralized Unit), a new radio base station, a radio remote module, a micro base station, a relay, a distributed network element (Distributed Unit), a reception point (RP) or a transmission point (TP), a DU and a TP/TRP, or any other wireless access device. However, the embodiments of this application are not limited thereto.

Figure 1:
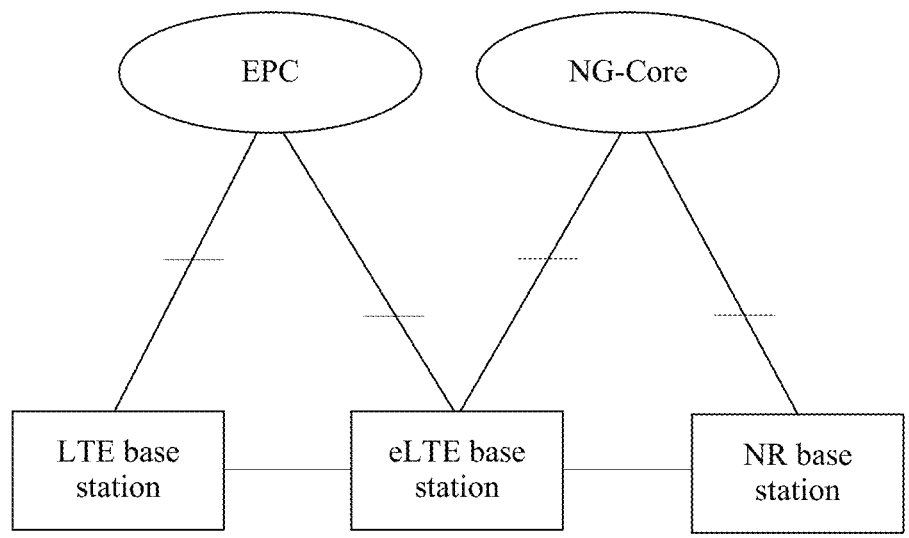
FIG. 1 is a schematic diagram of a network architecture to which an embodiment of this application is applicable.

FIG. 1 is a schematic diagram of a network architecture to which an embodiment of this application is applicable. In FIG. 1, an evolved packet core (EPC) network coexists with a next-generation core network, and an LTE base station is connected to the EPC. In this embodiment of this application, an LTE base station that can access the EPC and the next-generation core network is referred to as an eLTE base station. In FIG. 1, the eLTE base station may be connected to the EPC and the next-generation core network, and a base station gNB of a next-generation radio access network (NR) may be connected to the next-generation core network.

Figure 2:
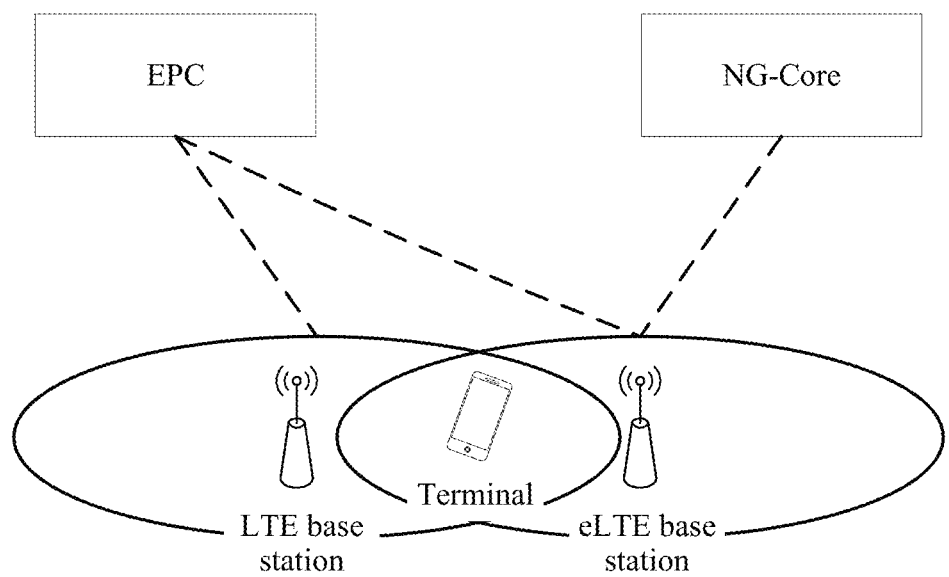
FIG. 2 is a schematic diagram of a scenario to which an embodiment of this application is applicable.

A terminal may be connected to the EPC or the next-generation core network by using a base station as required. Specifically, with reference to FIG. 1, FIG. 2 is a schematic diagram of a scenario to which an embodiment of this application is applicable. In FIG. 2, an LTE base station is connected to an EPC, and an eLTE base station is connected to the EPC and a next-generation core network. A terminal is located in an area in which the LTE base station overlaps with the eLTE base station. The terminal may be connected to the EPC or the next-generation core network by using the eLTE base station, or may be connected to the EPC by using the LTE base station.

Figure 3:
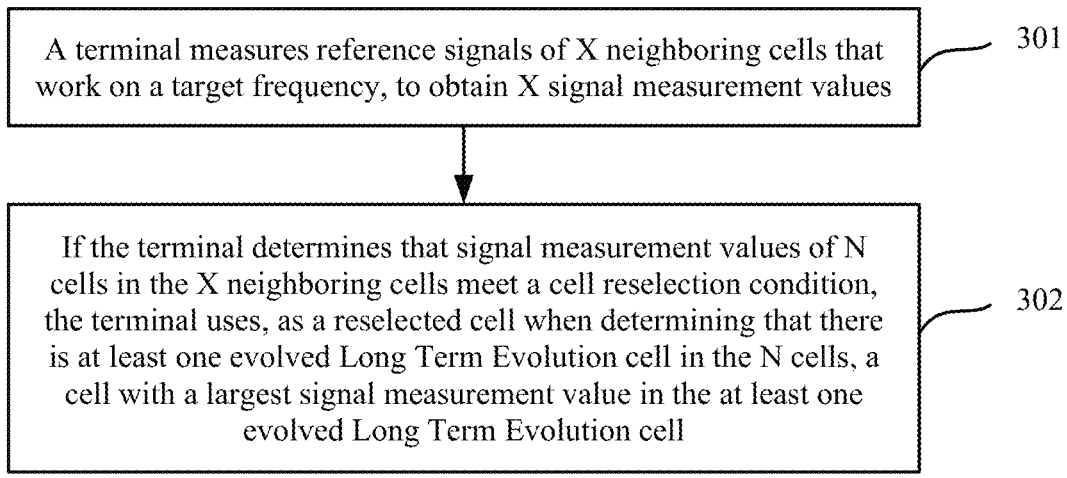
FIG. 3 is a schematic flowchart of a cell reselection method according to an embodiment of this application.

Based on the foregoing descriptions, FIG. 3 is a schematic flowchart of a cell reselection method according to an embodiment of this application.

Referring to FIG. 3, the method includes the following steps.

Step 301: A terminal measures reference signals of X neighboring cells that work on a target frequency, to obtain X signal measurement values.

Step 302: If the terminal determines that signal measurement values of N cells in the X neighboring cells meet a cell reselection condition, the terminal uses, as a reselected cell when determining that there is at least one evolved long term evolution cell in the N cells, a cell with a largest signal measurement value in the at least one evolved long term evolution cell.

The terminal may convert a signal measurement value of the at least one evolved long term evolution cell into a rank of each neighboring cell by using a preset algorithm, to rank the at least one evolved long term evolution cell. For example, the terminal may calculate an R (Rank) value of each evolved long term evolution cell based on a signal measurement value of each evolved long term evolution cell, to determine a rank of each evolved long term evolution cell based on the R value. For calculation of the R value, refer to the prior art. Details are not described herein.

It should be noted that, in this embodiment of this application, an evolved long term evolution eLTE cell may use a same frequency and a same air interface transmission technology as an LTE cell, and the eLTE cell may be connected to an EPC, or may be connected to a next-generation core network such as a 5G core network. The next-generation core network in this embodiment of this application is a core network of a 5G network.

Optionally, before step 301, the terminal may be in a power-off state. When the terminal is powered on and started, the terminal needs to select a cell for camping. If the terminal is a terminal that can access both the EPC and the next-generation core network, and the terminal may choose to preferentially access the next-generation core network after power-on, the terminal needs to preferentially select an evolved long term evolution cell for camping.

Subsequently, the terminal selects a public land mobile network (PLMN) and a frequency, and searches for a proper cell on the selected frequency. If the cell does not broadcast cell type indication information indicating a type of the cell, the terminal may perform cell selection in an existing manner, and details are not described herein. If the cell broadcasts cell type indication information indicating a type of the cell, after the terminal learns of the cell on the selected frequency through scanning, the terminal determines, by measuring a reference signal of the cell, that the reference signal meets the cell reselection condition, and determines, by reading system information of the cell, that the cell is an evolved long term evolution cell. In this case, the terminal may choose to access the cell. If an evolved long term evolution cell that can meet a cell selection criterion cannot be found, an LTE cell that can be accessed is searched for according to an existing mechanism.

In this embodiment of this application, the cell reselection condition may be a cell reselection condition in a 4G network system, and details are not described herein.

Certainly, the foregoing is merely an example. The terminal may select a cell for access in another manner when being powered on, and details are not described herein.

In step 301, in a possible implementation, after the terminal camps on a cell, if the terminal determines that there is a cell whose working frequency reselection priority is higher than a reselection priority of a working frequency of the cell on which the terminal currently camps, the terminal may start to perform measurement to perform cell reselection.

The following describes specific steps after the terminal starts to perform measurement.

Step 1: The terminal selects the target frequency, where the target frequency is a frequency whose reselection priority is higher than the reselection priority of the working frequency of the cell on which the terminal currently camps.

Step 2: The terminal measures a neighboring cell on the target frequency.

Optionally, this step includes: if the terminal determines that the target frequency is an LTE frequency, reading, by the terminal, neighboring cell type indication information in system information of the currently camped-on cell, and determining whether there is an evolved long term evolution cell in the neighboring cell; or if the frequency is not an LTE frequency, directly determining, by the terminal, that there is no evolved long term evolution cell on the frequency.

Step 3: The terminal determines, based on a measurement result, whether the measured cell meets the cell reselection condition, to obtain N cells that meet the cell reselection condition. This step may include the following two cases:

Case 1: If there is an evolved long term evolution cell in the N cells, an evolved long term evolution cell with best signal quality is selected as a reselected cell from the N neighboring cells that meet the cell reselection condition on the target frequency.

Case 2: If there is no evolved long term evolution cell in the N cells, a cell with best signal quality is selected as a reselected cell, or cells are sequentially continuously scanned on another frequency in descending order of frequency priorities, until an optional evolved long term evolution cell is found and is used as a reselected cell, and if no optional evolved long term evolution cell is found, a cell with a highest working frequency reselection priority is selected as a reselected cell from cells that are found through scanning and that meet the cell reselection condition.

In another possible implementation, after the terminal camps on a cell, if the terminal determines that there is a cell whose working frequency reselection priority is the same as a reselection priority of a working frequency of the cell on which the terminal currently camps, the terminal starts to perform measurement to perform cell reselection.

The following describes specific steps after the terminal starts to perform measurement.

Step 1: The terminal selects the target frequency, where the target frequency is a frequency whose reselection priority is the same as the reselection priority of the working frequency of the cell on which the terminal currently camps.

Step 2: The terminal measures the X neighboring cells on the target frequency to obtain the X signal measurement values.

Step 3: For a cell signal quality measurement result, the terminal calculates a signal measurement value of each neighboring cell and a signal measurement value of the currently camped-on cell, determines whether there is a cell that meets the cell reselection condition in the cell on which the terminal currently camps and the X neighboring cells, and if there is a cell that meets the cell reselection condition, obtains N cells that meet the cell reselection condition. Then, the terminal ranks the N cells based on signal measurement values of the N cells, and selects, based on a ranking result, a cell that meets the cell reselection condition. The terminal may determine, based on the signal measurement values, values such as R values of each neighboring cell and the currently camped-on cell, and then rank the foregoing cells based on the R values. This step may include the following two cases:

Case 1: If there is an evolved long term evolution cell in the foregoing N cells, an evolved long term evolution cell with a highest rank in the cells on the target frequency is selected as a reselected cell. For example, an evolved long term evolution cell with a largest R value may be selected as a reselected cell.

Case 2: If there is no evolved long term evolution cell in the N cells, a cell with a highest rank is selected as a reselected cell, or cells are sequentially continuously scanned on another frequency in descending order of frequency priorities, until an optional evolved long term evolution cell is found and is used as a reselected cell, and if no optional evolved long term evolution cell is found, a cell with a highest working frequency reselection priority is selected as a reselected cell.

In another possible implementation, after the terminal camps on a cell, if the terminal determines that there is a cell whose working frequency reselection priority is lower than a reselection priority of a working frequency of the cell on which the terminal currently camps, the terminal starts to perform measurement to perform cell reselection.

The following describes specific steps after the terminal starts to perform measurement.

Step 1: The terminal selects the target frequency, where the target frequency is a frequency whose reselection priority is lower than the reselection priority of the working frequency of the cell on which the terminal currently camps.

Step 2: The terminal measures a neighboring cell on the target frequency.

Optionally, this step includes: if the terminal determines that the target frequency is an LTE frequency, reading, by the terminal, neighboring cell type indication information in system information of the currently camped-on cell, and determining whether there is an evolved long term evolution cell in the neighboring cell; or if the frequency is not an LTE frequency, directly determining, by the terminal, that there is no evolved long term evolution cell on the frequency.

Step 3: The terminal determines, based on a measurement result, whether the measured cell meets the cell reselection condition. If there are N cells that meet the cell reselection condition, this step may include the following two cases:

Case 1: If there is an evolved long term evolution cell in the N cells, an evolved long term evolution cell with best signal quality is selected as a reselected cell from the N neighboring cells that meet the cell reselection condition on the target frequency.

Case 2: If there is no evolved long term evolution cell in the N cells, a cell with best signal quality is selected as a reselected cell.

In another possible implementation, after camping on a cell, the terminal may determine whether a measurement trigger condition is met, and perform measurement if it is determined that the measurement trigger condition is met.

The measurement trigger condition may include one or more of the following:

the terminal receives a notification message sent by an access network device, where the notification message indicates that there is an evolved long term evolution cell on the target frequency; and the notification message may be sent by the access network device through broadcasting, or may be sent by the access network device to the terminal by using dedicated signaling, and this is not limited in this embodiment of this application;

the terminal determines that the terminal does not camp on the evolved long term evolution cell;

the terminal determines that signal quality of the currently camped-on cell is less than a threshold; and the terminal receives measurement indication information sent by the access network device, where the measurement indication information is used to instruct the terminal to perform measurement.

Optionally, before determining whether the measurement trigger condition is met, the terminal may further determine that the cell on which the terminal currently camps meets the following conditions: the terminal determines that the currently camped-on cell is an LTE cell, and that there is an evolved long term evolution cell that has a same working frequency reselection priority as that of the currently camped-on cell or has a lower working frequency reselection priority than that of the currently camped-on cell in neighboring cells of the currently camped-on cell.

It should be noted that, in this embodiment of this application, the terminal may determine, according to the received cell type indication information, whether a cell on which the terminal camps or a neighboring cell of the cell on which the terminal camps is an evolved long term evolution cell or an LTE cell. Details are described below.

In a first implementation, the access network device sends cell type indication information indicating that the cell on which the terminal camps is an evolved long term evolution cell, to indicate that the cell on which the terminal camps is an LTE cell or an evolved long term evolution cell.

In a second implementation, the access network device sends, to the terminal, cell type indication information corresponding to the neighboring cell of the cell on which the terminal camps, to indicate that the neighboring cell of the cell on which the terminal camps is an LTE cell or an evolved long term evolution cell.

Based on the foregoing descriptions, optionally, before step 302, the terminal may further receive first cell type indication information sent by the currently camped-on cell, where the first cell type indication information indicates that the cell on which the terminal currently camps is an LTE cell or an evolved long term evolution cell.

Correspondingly, for any one of the N neighboring cells, the terminal receives first cell type indication information sent by the neighboring cell, or the terminal receives second cell type indication information sent by the camped-on cell. The first cell type indication information indicates, to the terminal, that the cell is an LTE cell or an evolved long term evolution cell, and the second cell type indication information indicates, to the terminal, that the neighboring cell of the camped-on cell is an LTE cell or an evolved long term evolution cell.

Optionally, a base station may send the first type cell indication information to the terminal through broadcasting.

Optionally, the base station may send the second type cell indication information to the terminal through broadcasting, or send the second type cell indication information to the terminal by using dedicated signaling of the terminal.

Subsequently, in step 302, the terminal ranks the N cells based on the N signal measurement values. Based on a ranking result and whether there is an evolved long term evolution cell in the N cells, the following cases may exist:

Case 1: When determining that there is at least one evolved long term evolution cell whose signal measurement value is greater than a preset threshold in the N cells, the terminal uses, as a reselected cell, a cell with a highest rank in the at least one evolved long term evolution cell.

Case 2: If the terminal determines that there is no evolved long term evolution cell whose signal measurement value is greater than a preset threshold in the N cells, the terminal uses, as a reselected cell, a cell whose signal measurement value is largest and is greater than the preset threshold or a cell with a highest rank in the N cells.

Case 3: If the terminal determines that there is no evolved long term evolution cell whose signal measurement value is greater than a preset threshold in the N cells, for M cells that work on a frequency other than the target frequency, the terminal uses, as a reselected cell when there is an evolved long term evolution cell in the M cells, a cell whose signal measurement value is largest and is greater than the preset threshold and that has a highest working frequency priority or a cell with a highest rank in the evolved long term evolution cell in the M cells.

Case 4: If the terminal determines that there is no evolved long term evolution cell whose signal measurement value is greater than a preset threshold in the N cells, for M cells that work on a frequency other than the target frequency, the terminal uses, as a reselected cell when there is no evolved long term evolution cell whose signal measurement value is greater than the preset threshold in the M cells, a cell whose signal measurement value is largest and is greater than the preset threshold in the M cells.

In this embodiment of this application, to enable the terminal to distinguish cell types, the base station sends cell type indication information to the terminal, to indicate whether a cell corresponding to the cell type indication information is an LTE cell or an evolved long term evolution cell. Before the base station sends the cell type indication information to the terminal, the base station and the terminal may send capability information to each other, where the capability information indicates a network function supported by the base station. Details are described below.

Figure 4:
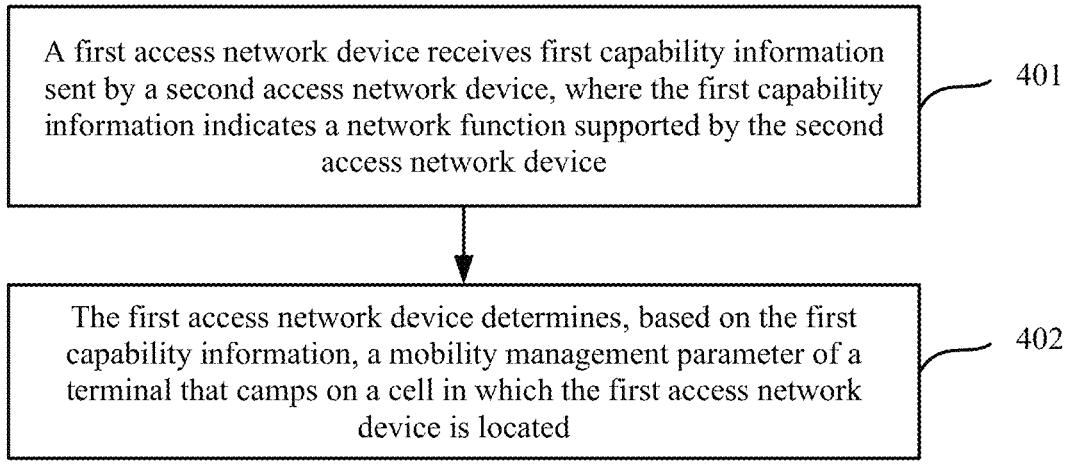
FIG. 4 is a schematic flowchart of a communication method according to an embodiment of this application.

FIG. 4 is a schematic flowchart of a communication method according to an embodiment of this application.

Referring to FIG. 4, the method includes the following steps.

Step 401: A first access network device receives first capability information sent by a second access network device, where the first capability information indicates a network function supported by the second access network device. The first access network device and the second access network device may communicate with each other through an interface such as an X2 interface.

Step 402: The first access network device determines, based on the first capability information, a mobility management parameter of a terminal that camps on a cell in which the first access network device is located.

The mobility management parameter may include parameters such as a dedicated frequency priority for cell reselection.

In this embodiment of this application, the capability information may indicate that an access network device supports one or more of the following functions:

whether the access network device is an access network device of an eLTE type;

whether the access network device accesses a next-generation core network;

whether the access network device supports a network slice;

a type of the network slice supported by the access network device;

whether the access network device supports a quality of service (QoS) framework of the next-generation core network; and whether the access network device supports mobility management on a terminal in a third mode, where the third mode may be an economic mode, an inactive mode, or the like.

In step 401, after receiving the first capability information, the first access network device may add the "first capability information" of the second access network device to a neighboring cell list maintained by the first access network device.

In addition, the first access network device may further send second capability information to the second access network device, where the second capability information indicates a network function supported by the first access network device.

The first access network device may further send cell type indication information to the terminal, where the cell type indication information indicates that a cell corresponding to the cell type indication information is an LTE cell or an evolved long term evolution cell.

For example, the first access network device sends first cell type indication information to the terminal, to indicate that the cell on which the terminal camps is an LTE cell or an evolved long term evolution cell. Alternatively, the first access network device sends second cell type indication information to the terminal, to indicate that a neighboring cell of the cell on which the terminal camps is an LTE cell or an evolved long term evolution cell.

Optionally, in this embodiment of this application, the first access network device may further receive an access class barred (ACB) list and a core network type identifier corresponding to the ACB list that are sent by a core network device, where the core network type identifier indicates a core network corresponding to the ACB list. The ACB list includes at least one access class (AC). A network side may set different access probabilities for different ACs to perform access control. For example, if the first access network device accesses both a first core network and a second core network, the first access network device may receive a first ACB list and a first core network type identifier, and a second ACB list and a second core network type identifier, where the first core network type identifier indicates that the first ACB list corresponds to the first core network, and the second core network type identifier indicates that the second ACB list corresponds to the second core network.

The first core network may be an EPC, and the second core network may be a next-generation core network. Certainly, alternatively, the first core network may be a next-generation core network, and the second core network may be an EPC.

In this embodiment of this application, a core network corresponding to each of a plurality of ACB lists is indicated to the terminal by using a core network type identifier, so that access control is separately performed on the terminal in different core networks, and access control of core networks does not affect each other. In this way, each core network may determine, based on a status such as load of the core network, whether the terminal is allowed to access. For example, after the terminal reads system information of a cell, when obtaining an ACB list for determining whether the cell is "barred", the terminal needs to distinguish a core network corresponding to the ACB list. If the ACB list corresponds to the EPC, when the terminal determines, based on the ACB list, that access to the cell is barred, the terminal cannot initiate a core network access procedure such as attachment to the EPC, but access of the terminal to the next-generation core network is not affected, and vice versa.

In step 402, when the mobility management parameter includes the dedicated frequency priority for cell reselection by the terminal, if the first access network device determines, based on the first capability information, that the second access network device is an access network device of an eLTE type, a priority of a frequency used by the second access network device in the dedicated frequency priority is increased, so that a probability that the terminal reselects a cell in which the second access network device is located is increased when the terminal performs cell reselection.

The first access network device may further select, based on the first capability information of the second access network device, a target cell to which the terminal is to be handed over. Optionally, the target cell that can support a service type of the terminal may be selected based on the service type. For example, the terminal device uses a network slice in a source cell, and the source cell selects, for the terminal, a neighboring cell that supports the network slice as the target cell to which the terminal is to be handed over.

When the terminal moves between cells, if the terminal moves from the source cell to the target cell, the target cell needs to obtain context information of the terminal from the source cell after the terminal accesses the target cell. In this embodiment of this application, after the terminal moves from the source cell to the target cell, the terminal sends a message to the target cell, where the message carries source cell information, and the source cell information is used to assist the target cell in finding the source cell of the terminal. The target cell sends a request message to the source cell, where the request message is used to request to obtain the context information of the terminal. The source cell receives the request, and sends context information corresponding to each core network and a context identifier corresponding to each piece of context information of the terminal to the target cell, where each context identifier indicates a core network corresponding to context information corresponding to the context identifier. According to the foregoing method, because each piece of context information has a corresponding context identifier, a core network corresponding to each piece of context information is indicated to the target cell, so that the target cell can determine the core network corresponding to each piece of context information, to avoid ambiguity in obtaining context information, and facilitate context establishment between a plurality of core networks by the terminal.

A plurality of access network types coexist in a 5G network, for example, an LTE base station, an eLTE base station, and an NR base station. Through coordination between different types of base stations, a plurality of network architectures may be obtained, in other words, there are a plurality of 5G network architectures. The NR base station may have two deployment manners: an NSA NR base station and an SA NR base station. The NSA NR base station is a base station deployment manner. In this deployment manner, the NR base station needs to be connected to an LTE base station or an eLTE base station, and the LTE base station or the eLTE base station serves as a control plane anchor of the NR base station and is connected to the EPC or the next-generation core network. The SA NR base station is another base station deployment manner. In this deployment manner, the NR base station establishes a signaling plane connection to the next-generation core network. In a first possible architecture, the LTE base station is connected to the EPC, the LTE base station is connected to the non-standalone (NSA) NR base station, and a user plane of the NSA NR base station is connected to the EPC by using the LTE base station or is directly connected to the EPC. Correspondingly, a terminal supporting the network architecture is connected to the EPC by using the LTE base station, and transmits data by using the LTE base station and the NR base station. In this case, the terminal of this type may need to perform signal measurement on an NSA NR cell. However, the terminal of this type does not choose to camp on an NSA NR cell or a standalone (SA) NR cell during cell selection or cell reselection. To enable the terminal to be connected to the EPC only by using the LTE base station, and transmit data by using the NSA NR base station, any one of the following manners may be used:

Manner 1: The NR base station uses a unique frequency different from that of the LTE base station. That is, the terminal may distinguish the NR base station from another system only by using the frequency. When the terminal performs cell selection or cell reselection, the terminal does not sweep the frequency used by the NR base station.

Manner 2: A capability of the terminal is set to not support an NR RAT (RAT). Therefore, a cell whose RAT type is NR is not considered during cell selection or cell reselection.

Manner 3: Each type of cell uses a different type of physical signal feature, so that a type of each cell can be determined by identifying a physical signal feature of the cell. The terminal may not camp on an NR cell after determining that the physical signal feature of the cell is the NR cell.

Manner 4: The NR cell broadcasts, by using system information, that an RAT type of the NR cell is NR. When the terminal determines, by reading the system information, that the RAT type of the cell that sends the system information is NR, the terminal does not choose to camp on the cell.

Manner 5:
Step 1: When performing cell selection, if the terminal determines that a cell to be accessed is an NR cell, the terminal directly determines that the terminal is not allowed to access, and therefore the terminal does not camp on the NR cell during cell selection.

Step 2: A cell neighboring cell list broadcast by the LTE base station does not include the NR cell. When performing cell reselection, the terminal does not measure the NR cell that is not included in the cell list, and therefore the terminal does not select the NR cell during cell reselection.

The foregoing method 1 to method 5 may also be used in a second possible architecture. In the second possible architecture, the eLTE base station is connected to the next-generation core network, the eLTE base station is connected to the NSA NR base station, and a user plane of the NSA NR base station is connected to the next-generation core network by using the eLTE base station or is directly connected to the next-generation core network. Correspondingly, a terminal supporting the network architecture is connected to the next-generation core network by using the eLTE base station, and transmits data by using the eLTE base station and the NR base station. In this case, the terminal of this type may need to perform signal measurement on an NSA NR cell. However, the terminal of this type does not choose to camp on an NSA NR cell or a standalone (SA) NR cell during cell selection or cell reselection. Correspondingly, the method 5 is as follows:

Method 5:
Step 1: When performing cell selection, if the terminal determines that a cell to be accessed is an NR cell, the terminal determines that the terminal is not allowed to access, and therefore the terminal does not camp on the NR cell during cell selection. Step 2: A cell neighboring cell list broadcast by the eLTE base station does not include the NR cell. When performing cell reselection, the terminal does not measure the NR cell that is not included in the cell list, and therefore the terminal does not select the NR cell during cell reselection.

After the foregoing method 1 to method 5 are used, in this architecture, the terminal can be connected to the next-generation core network only by using the eLTE base station, and may transmit data by using the NR cell.

In this embodiment of this application, an NR terminal is a terminal that only has a capability of accessing the next-generation core network by using the NR cell. The NSA NR base station is a base station that is not directly connected to a core network on a signaling plane, cannot connect the NR terminal to the core network, and can only provide a data transmission function for the NR terminal.

Several architectures are first described. In a third possible architecture, an NR gNB is directly connected to the next-generation core network.

In the first possible architecture to the third possible architecture, the terminal may not camp on the NSA NR cell in any one of the following manners.

Manner 1: Step 1: The NSA NR cell is set to barred, and the terminal does not choose to camp on the NSA NR cell during cell selection. Step 2: A neighbor list broadcast by a current serving cell of the terminal does not include the NSA NR cell, and the terminal does not consider the NSA NR cell during cell reselection.

Manner 3: A cell broadcasts network type indication information, where the network type indication information indicates that the cell is an NSA NR cell or an SA NR cell. The NR terminal reads the network type indication information broadcast by the cell, to determine that the cell is an NSA NR cell or an SA NR cell. Therefore, the terminal performs cell selection or cell reselection based on a network type of the cell, for example, the terminal does not select the NSA NR cell.

Based on a same technical concept, an embodiment of this application further provides a cell reselection apparatus, and the apparatus may perform the foregoing method embodiment.

Figure 5:
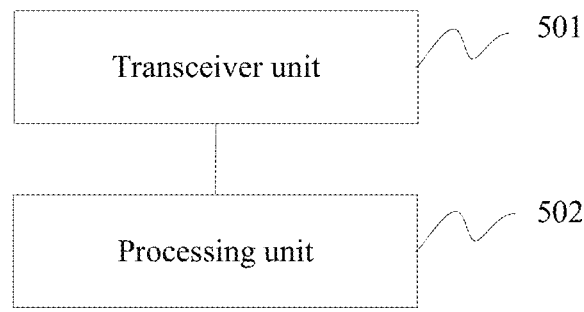
FIG. 5 is a schematic structural diagram of a cell reselection apparatus according to an embodiment of this application.

Referring to FIG. 5, the apparatus includes:

a transceiver unit 501, configured to measure reference signals of X neighboring cells that work on a target frequency, to obtain X signal measurement values; and a processing unit 502, configured to: if it is determined that signal measurement values of N cells in the X neighboring cells meet a cell reselection condition, use, as a reselected cell when determining that there is at least one evolved long term evolution cell in the N cells, a cell with a largest signal measurement value in the at least one evolved long term evolution cell.

Optionally, if a cell reselection priority of the target frequency is the same as a cell reselection priority of a working frequency of a currently camped-on cell, after the reference signals of the X neighboring cells that work on the target frequency are measured to obtain the X signal measurement values, the processing unit 502 is further configured to:

measure a reference signal of the currently camped-on cell to obtain a signal measurement value of the currently camped-on cell; and if it is determined that signal measurement values of N cells in the currently camped-on cell and the X neighboring cells meet the cell reselection condition, rank the N cells based on the signal measurement values of the N cells, and use, as a reselected cell when determining that there is at least one evolved long term evolution cell in the N cells, a cell with a highest rank in the at least one evolved long term evolution cell.

Optionally, the processing unit 502 is further configured to:

if it is determined that there is no evolved long term evolution cell in the N cells, use, as a reselected cell, a cell with a largest signal measurement value in the N cells.

Optionally, the processing unit 502 is further configured to:

if it is determined that there is no evolved long term evolution cell in the N cells, for M cells that work on a frequency other than the target frequency, use, as a reselected cell when there is an evolved long term evolution cell in the M cells, a cell whose signal measurement value is largest and is greater than a preset threshold and that has a highest working frequency priority in the evolved long term evolution cell in the M cells.

Optionally, the processing unit 502 is further configured to:

if it is determined that there is no evolved long term evolution cell whose signal measurement value is greater than a preset threshold in the N cells, for M cells that work on a frequency other than the target frequency, use, as a reselected cell when there is no evolved long term evolution cell whose signal measurement value is greater than the preset threshold in the M cells, a cell whose signal measurement value is largest and is greater than the preset threshold in the M cells.

Optionally, the transceiver unit 501 is further configured to:

for any one of the N cells, receive first cell type indication information sent by the currently camped-on cell, or receive first cell type indication information sent by the neighboring cell, where the first cell type indication information indicates that the cell is an evolved long term evolution cell; and determine, according to the first cell type indication information, whether the cell is an evolved long term evolution cell.

Optionally, the transceiver unit 501 is further configured to:

receive second cell type indication information sent by the currently camped-on cell, where the second cell type indication information indicates that the neighboring cell of the cell on which the terminal currently camps is an evolved long term evolution cell.

Optionally, the transceiver unit 501 is further configured to:

receive a notification message sent by an access network device, where the notification message indicates that there is an evolved long term evolution cell on the target frequency.

Optionally, the transceiver unit 501 is further configured to:

determine that the currently camped-on cell is not an evolved long term evolution cell.

Based on a same technical concept, an embodiment of this application further provides a terminal, and the terminal may perform the foregoing method embodiment.

Figure 6:
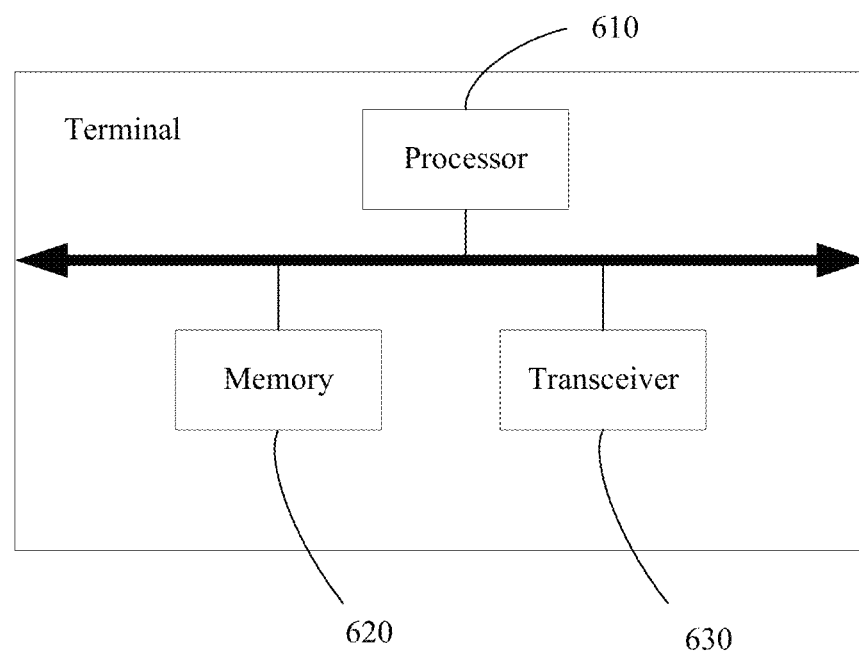
FIG. 6 is a schematic structural diagram of a terminal according to an embodiment of this application.

Referring to FIG. 6, the terminal includes a processor 610, a memory 620, and a transceiver 630. The transceiver 630 may be connected to an antenna. In a downlink direction, the transceiver 630 receives, by using the antenna, information sent by a base station, and sends the information to the processor 610 for processing. In an uplink direction, the processor 610 processes data of the terminal, and sends the data to the base station by using the transceiver 630.

The transceiver 630 is configured to measure reference signals of X neighboring cells that work on a target frequency, to obtain X signal measurement values.

The processor 610 is configured to: if it is determined that signal measurement values of N cells in the X neighboring cells meet a cell reselection condition, use, as a reselected cell when determining that there is at least one evolved long term evolution cell in the N cells, a cell with a largest signal measurement value in the at least one evolved long term evolution cell.

Optionally, if a cell reselection priority of the target frequency is the same as a cell reselection priority of a working frequency of a currently camped-on cell, after the reference signals of the X neighboring cells that work on the target frequency are measured to obtain the X signal measurement values, the processor 610 is further configured to:

measure a reference signal of the currently camped-on cell to obtain a signal measurement value of the currently camped-on cell; and if it is determined that signal measurement values of N cells in the currently camped-on cell and the X neighboring cells meet the cell reselection condition, rank the N cells based on the signal measurement values of the N cells, and use, as a reselected cell when determining that there is at least one evolved long term evolution cell in the N cells, a cell with a highest rank in the at least one evolved long term evolution cell.

Optionally, the processor 610 is further configured to:

if it is determined that there is no evolved long term evolution cell in the N cells, use, as a reselected cell, a cell with a largest signal measurement value in the N cells.

Optionally, the processor 610 is further configured to:

if it is determined that there is no evolved long term evolution cell in the N cells, for M cells that work on a frequency other than the target frequency, use, as a reselected cell when there is an evolved long term evolution cell in the M cells, a cell whose signal measurement value is largest and is greater than a preset threshold and that has a highest working frequency priority in the evolved long term evolution cell in the M cells.

Optionally, the processor 610 is further configured to:

if it is determined that there is no evolved long term evolution cell whose signal measurement value is greater than a preset threshold in the N cells, for M cells that work on a frequency other than the target frequency, use, as a reselected cell when there is no evolved long term evolution cell whose signal measurement value is greater than the preset threshold in the M cells, a cell whose signal measurement value is largest and is greater than the preset threshold in the M cells.

Optionally, the transceiver 630 is further configured to:

for any one of the N cells, receive first cell type indication information sent by the currently camped-on cell, or receive first cell type indication information sent by the neighboring cell, where the first cell type indication information indicates that the cell is an evolved long term evolution cell; and determine, according to the first cell type indication information, whether the cell is an evolved long term evolution cell.

Optionally, the transceiver 630 is further configured to:

receive second cell type indication information sent by the currently camped-on cell, where the second cell type indication information indicates that the neighboring cell of the cell on which the terminal currently camps is an evolved long term evolution cell.

Optionally, the transceiver 630 is further configured to:

receive a notification message sent by an access network device, where the notification message indicates that there is an evolved long term evolution cell on the target frequency.

Optionally, the transceiver 630 is further configured to:

determine that the currently camped-on cell is not an evolved long term evolution cell.

In this embodiment of this application, the transceiver 630 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor 610 may be a central processing unit (CPU), a network processor (NP), or a combination of a CPU and an NP. The processor 610 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The memory 620 may include a volatile memory, for example, a random access memory (RAM); the memory 620 may also include a non-volatile memory, for example, a read-only memory (ROM), a flash memory, a hard disk drive (HDD), or a solid-state drive (SSD); and the memory 620 may further include a combination of the foregoing types of memories.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor 610 of any other programmable data processing device to generate a machine, so that the instructions executed by the computer or the processor 610 of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the embodiments and all changes and modifications falling within the scope of this application.

Obviously, persons skilled in the art can make various modifications and variations to this application without departing from the scope of this application. This application is intended to cover these modifications and variations provided that they fall within the scope of protection defined by the following claims.

What is claimed is:

1. A method, comprising:
   measuring, by a terminal, reference signals of X neighboring cells, to obtain X signal measurement values, wherein each of the X neighboring cells operate on a target frequency;
   determining, by the terminal, that signal measurement values of N cells of the X neighboring cells meet a cell reselection condition;
   determining, by the terminal, whether there is at least one evolved long term evolution cell in the N cells; and
   when it is determined there is at least one evolved long term cell in the N cells, using, by the terminal, a cell having a largest signal measurement value in the at least one evolved long term evolution cell in the N cells as a reselected cell.

2. The method according to claim 1, further comprising:
   when a cell reselection priority of the target frequency is the same as a cell reselection priority of a working frequency of a currently camped-on cell, and after measuring the reference signals of the X neighboring cells, to obtain the X signal measurement values, performing the following:
      measuring, by the terminal, a reference signal of the currently camped-on cell, to obtain a signal measurement value of the currently camped-on cell; and
      when the terminal determines that the signal measurement values of the N cells of the X neighboring cells and the signal measurement value of the currently camped-on cell meet the cell reselection condition, ranking, by the terminal, the N cells and the currently camped-on cell based on the signal measurement values of the N cells and the signal measurement value of the currently camped-on cell; and using, when it is determined that there is at least one evolved long term evolution cell in the N cells, a cell with a highest rank in the at least one evolved long term evolution cell as the reselected cell.

3. The method according to claim 1, further comprising: when it is determined there is no evolved long term evolution cell in the N cells, using, by the terminal, a cell having a largest signal measurement value in the N cells as the reselected cell.

4. The method according to claim 1, further comprises: when it is determined there is no evolved long term evolution cell in the N cells, using, by the terminal when it is determined there is at least one evolved long term evolution cell in M cells, a first cell of the M cells as the reselected cell, wherein the M cells operate using a frequency other than the target frequency, a signal measurement value of the first cell is largest in the M cells and is greater than a preset threshold, and the first cell has a highest working frequency priority in the at least one evolved long term evolution cell in the M cells.

5. The method according to claim 1, further comprising: when the terminal determines that there is no evolved long term evolution cell whose signal measurement value is greater than a preset threshold in the N cells, using, by the terminal when there is no evolved long term evolution cell whose signal measurement value is greater than the preset threshold in M cells, a first cell as the reselected cell, wherein the M cells operate using a frequency other than the target frequency, a signal measurement value of the first cell is largest in the M cells and is greater than the preset threshold.

6. The method according to claim 1, wherein before determining whether there is at least one evolved long term evolution cell in the N cells, the method further comprises:
receiving, by the terminal, first cell type indication information from a currently camped-on cell, or receiving, by the terminal, first cell type indication information from a neighboring cell of the currently camped-on cell, wherein the first cell type indication information indicates that the currently camped-on cell is an evolved long term evolution cell; and
determining, by the terminal according to the first cell type indication information, whether the currently camped-on cell is an evolved long term evolution cell.

7. The method according to claim 1, wherein before determining whether there is at least one evolved long term evolution cell in the N cells, the method further comprises:
receiving, by the terminal, second cell type indication information from a currently camped-on cell, wherein the second cell type indication information indicates that a first neighboring cell of the currently camped-on cell is an evolved long term evolution cell.

8. The method according to claim 1, wherein before measuring, by the terminal, the reference signals of the X neighboring cells, the method further comprises:
receiving, by the terminal, a notification message from an access network device, wherein the notification message indicates that there is an evolved long term evolution cell operating using the target frequency.

9. The method according to claim 8, further comprising: determining, by the terminal, that a currently camped-on cell is not an evolved long term evolution cell.

10. An apparatus, comprising:
a transceiver, configured to measure reference signals of X neighboring cells, to obtain X signal measurement values, wherein each of the X neighboring cells operate on a target frequency;
a processor; and
a non-transitory computer-readable storage medium storing a program to be executed by the processor, the program including instructions for:
determining that signal measurement values of N cells of the X neighboring cells meet a cell reselection condition;
determining whether there is at least one evolved long term evolution cell in the N cells; and
when it is determined there is at least one evolved long term evolution cell in the N cells, using a cell with a largest signal measurement value in the at least one evolved long term evolution cell in the N cells as a reselected cell.

11. The apparatus according to claim 10, wherein the program further includes instructions for:
when a cell reselection priority of the target frequency is the same as a cell reselection priority of a working frequency of a currently camped-on cell, and after the reference signals of the X neighboring cells are measured to obtain the X signal measurement values, measure a reference signal of the currently camped-on cell, to obtain a signal measurement value of the currently camped-on cell;
when it is determined that signal measurement values of the N cells of the X neighboring cells and the signal measurement value of the currently camped-on cell meet the cell reselection condition, rank the N cells and the currently camped-on cell based on the signal measurement values of the N cells and the signal measurement value of the currently camped-on cell; and
use, when it is determined there is at least one evolved long term evolution cell in the N cells and the currently camped-on cell, a cell with a highest rank in the at least one evolved long term evolution cell as the reselected cell.

12. The apparatus according to claim 10, wherein the program further includes instructions for:
when it is determined there is no evolved long term evolution cell in the N cells, use a cell with a largest signal measurement value in the N cells as the reselected cell.

13. The apparatus according to claim 10, wherein the program further includes instructions for:
when it is determined there is no evolved long term evolution cell in the N cells, and when there is at least one evolved long term evolution cell in M cells, use a first cell of the M cells as the reselected cell, wherein the M cells operate using a frequency other than the target frequency, a signal measurement value of the first cell is largest in the M cells and is greater than a preset threshold, and the first cell has a highest working frequency priority in the at least one evolved long term evolution cell in the M cells.

14. The apparatus according to claim 10, wherein the processor is further configured to:
when it is determined that there is no evolved long term evolution cell whose signal measurement value is greater than a preset threshold in the N cells, and when there is no evolved long term evolution cell whose signal measurement value is greater than the preset threshold in M cells, use a first cell as the reselected cell, wherein the M cells operate using a frequency other than the target frequency, and a signal measurement value of the first cell is largest in the M cells and is greater than the preset threshold.

15. The apparatus according to claim 10, wherein:
the transceiver is further configured to receive first cell type indication information from a currently camped-on cell, or receive first cell type indication information from a neighboring cell of the currently camped-on cell, wherein the first cell type indication information indicates that the currently camped-on cell is an evolved long term evolution cell; and
the program further includes instructions for determining, according to the first cell type indication information, whether the currently camped-on cell is an evolved long term evolution cell.

16. The apparatus according to claim 10, wherein the transceiver is further configured to:
receive second cell type indication information from a currently camped-on cell, wherein the second cell type indication information indicates that a first neighboring cell of the currently camped-on cell is an evolved long term evolution cell.

17. The apparatus according to claim 10, wherein the transceiver is further configured to:
receive a notification message from an access network device, wherein the notification message indicates that there is an evolved long term evolution cell operating using the target frequency.

18. The apparatus according to claim 17, wherein the program further includes instructions for:
determining that a currently camped-on cell is not an evolved long term evolution cell.

19. A non-transitory machine-readable medium having stored thereon a computer program comprising at least one code section for distributing data, the at least one code section being executable by one or more processors, and when executed by the one or more processors, the at least one code section causes the one or more processors to:
measure reference signals of X neighboring cells, to obtain X signal measurement values, wherein each of the X neighboring cells operate using a target frequency;
determine that signal measurement values of N cells in the X neighboring cells meet a cell reselection condition;
determine whether there is at least one evolved long term evolution cell in the N cells; and
when it is determined there is at least one evolved long term evolution cell in the N cells, use a cell having a largest signal measurement value in the at least one evolved long term evolution cell as a reselected cell.

20. The non-transitory machine-readable medium according to claim 19, wherein the at least one code section, when executed by the one or more processors, causes the one or more processors to:
when a cell reselection priority of the target frequency is the same as a cell reselection priority of a working frequency of a currently camped-on cell, and after the reference signals of the X neighboring cells are measured to obtain the X signal measurement values, measure a reference signal of the currently camped-on cell to obtain a signal measurement value of the currently camped-on cell;
when it is determined that the signal measurement values of N cells and the signal measurement value of the currently camped-on cell meet the cell reselection condition, rank the N cells and the currently camped-on cell based on the signal measurement values of the N cells and the signal measurement value of the currently camped-on cell; and
use, when it is determined that there is at least one evolved long term evolution cell in the N cells, a cell with a highest rank in the at least one evolved long term evolution cell as the reselected cell.

* * * * *